(12) United States Patent
Lin et al.

(10) Patent No.: US 12,342,066 B2
(45) Date of Patent: Jun. 24, 2025

(54) IMAGE CONTROL SYSTEM AND METHOD FOR CONTROLLING IMAGE DISPLAY

(71) Applicant: Aver Information Inc., New Taipei (TW)

(72) Inventors: Ge-Yi Lin, New Taipei (TW); Yun-Long Sie, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 139 days.

(21) Appl. No.: 18/173,191

(22) Filed: Feb. 23, 2023

(65) Prior Publication Data

US 2023/0283877 A1 Sep. 7, 2023

(30) Foreign Application Priority Data

Mar. 2, 2022 (TW) .................................. 111107566

(51) Int. Cl.
*H04N 23/61* (2023.01)
*H04N 5/77* (2006.01)
*H04N 23/62* (2023.01)
*H04N 23/63* (2023.01)

(52) U.S. Cl.
CPC ............... *H04N 23/61* (2023.01); *H04N 5/77* (2013.01); *H04N 23/62* (2023.01); *H04N 23/633* (2023.01)

(58) Field of Classification Search
CPC ........ G06V 40/28; H04N 23/61; H04N 23/62; H04N 23/633; H04N 5/77
See application file for complete search history.

(56) References Cited

U.S. PATENT DOCUMENTS

| 12,229,344 | B2* | 2/2025 | Belyaev | G06V 40/28 |
| 2015/0229837 | A1* | 8/2015 | Her | H04N 23/611 |
| | | | | 348/222.1 |
| 2023/0145592 | A1* | 5/2023 | Singh | H04N 21/42204 |
| | | | | 715/863 |
| 2023/0300448 | A1* | 9/2023 | Meyerson | H04N 23/695 |
| | | | | 348/14.03 |

FOREIGN PATENT DOCUMENTS

CN 101572023 B 10/2011

\* cited by examiner

*Primary Examiner* — Amy R Hsu
(74) *Attorney, Agent, or Firm* — McClure, Qualey & Rodack, LLP

(57) ABSTRACT

A method for controlling the image display includes an image capturing process, an image recognition process, a feature determination process, an image updating process, and an image outputting process. The image capturing process is to capture an input image. The image recognition process is to recognize a specified feature in the input image and generate a recognized image. The feature determination process is to determine whether a target feature exists in the recognized image and when the target feature exists in the recognized image, it also determines whether there is an indication pattern recorded in the image control system and generates a first command or a second command accordingly. The image updating process is to generate an indicator pattern according to the first command and superimpose the indicator pattern on the input image to generate an output image. The image outputting process is to output the output image.

10 Claims, 4 Drawing Sheets

US 12,342,066 B2

IMAGE CONTROL SYSTEM AND METHOD FOR CONTROLLING IMAGE DISPLAY

CROSS REFERENCE TO RELATED APPLICATIONS

This Non-provisional application claims priority under 35 U.S.C. § 119(a) on Patent Application No. 111107566 filed in Taiwan on Mar. 2, 2022, the entire contents of which are hereby incorporated by reference.

BACKGROUND

1. Technical Field

The present invention relates to a control system and a control method, in particular to an image control system and a method for controlling image display.

2. Description of Related Art

With the rapid development of transmission technology, the transmission of information or two-way communication through video images has gradually become popular among the public, such as in teaching or conferences.

Taking the teaching application as an example, the speaker can carry out the teaching on the spot to the far-end listener through the camera device and can explain the details and steps in detail. However, when the focus is relatively subtle (such as the subtle movements of hands or the manipulation of delicate objects) it may not be possible for all listeners to focus on the important target only through oral description. At this time, it is usually used in conjunction with an auxiliary device (such as a guide stick or a laser pointer) to point to the key point, or to operate the mouse to move the cursor to the key point.

However, the above methods need to be assisted by other assistants and cannot be completed by the speaker alone. Moreover, it is difficult to cooperate smoothly if the assistants and the speaker are out of tune.

Therefore, the inventor provides an image control system and a method for controlling image display so that the speaker can concentrate on explaining the implementation through intuitive and convenient operations, and at the same time allow the audience to focus on the key points placed intuitively.

SUMMARY OF THE INVENTION

In view of the foregoing, the object of the present invention is to provide an image control system and a method for controlling image display, which can allow the speaker to focus on explaining the implementation, and intuitively control the indicator pattern and screen changes on the screen.

To achieve the above, the present invention provides a method for controlling image display, which is used in conjunction with an image control system. The method for controlling image display includes an image capturing process, an image recognition process, a feature determination process, an image updating process, and an image outputting process. The image capturing process is to capture an input image. The image recognition process is to recognize at least one specified feature in the input image and generate a recognized image. The feature determination process is to judge whether there is a target feature in the recognized image, and when the target feature exists in the recognized image, further judge whether there is an indicator pattern recorded in the image control system and thereby generate a first command or a second command. The image updating process is to generate the indicator pattern according to the first command and superimposes the indicator pattern on the input image to generate an output image. The image outputting process is to output the output image.

In one aspect, the indicator pattern is superimposed on the input image corresponding to the specified feature position.

In one aspect, the method for controlling image display further includes a feature recording process for recording at least one feature information of the target feature according to the second command. The feature information includes a gesture category, a time, a coordinate, or a combination thereof.

In one aspect, the method for controlling image display further includes a logical operation process, which performs a logical operation according to the plurality of recorded feature information and performs the image updating process according to an operation result.

In one aspect, the image updating process also includes performing image processing on the input image including zooming, dragging, creating a new indicator pattern, or clearing the indicator pattern.

In addition, to achieve the above, the present invention also provides an image control system, which is used in conjunction with a method for controlling image display. The image control system includes an image capturing module, an image recognition module, a feature determination module, an image updating module, and an image outputting module. The image capturing module captures an input image. The image recognition module receives the input image and recognizes at least one specified feature in the input image to generate a recognized image. The feature determination module receives the recognized image and judges whether there is a target feature in the recognized image. When the target feature exists in the recognized image, the feature determination module further judges whether there is an indicator pattern recorded in the image control system and thereby generating a first command or a second command. The image updating module generates the indicator pattern according to the first command and superimposes the indicator pattern on the input image to generate an output image. The image outputting module receives and outputs the output image.

In one aspect, the image control system further includes a feature recording module for recording at least one feature information of the target feature according to the second command. The feature information includes but not limited to a gesture category, a time, a coordinate, or a combination thereof.

In one aspect, the image updating module further includes performing a logical operation process according to the plurality of recorded feature information and performing the image updating process according to an operation result of the logical operation process.

In one aspect, the image updating process further includes performing image processing on the input image including zooming, dragging, creating a new indicator pattern, or clearing the indicator pattern.

In one aspect, the feature recording module further records the presence or absence of the indicator pattern superimposed on the input image.

As mentioned above, the image control system and the method for controlling image display of the present invention perform image recognition on the specified feature and the target feature in the input image and can directly adjust the image screen according to the recognition result so as to improve the inconvenience of needing to manually control or adjust the image screen.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

The parts in the drawings are not necessarily drawn to scale, the emphasis instead being placed upon clearly illustrating the principles of at least one embodiment. In the drawings, like reference numerals designate corresponding parts throughout the various diagrams, and all the diagrams are schematic.

DETAILED DESCRIPTION

In the following description, this invention will be explained with reference to embodiments thereof. However, the description of these embodiments is only for purposes of illustration rather than limitation.

Figure 1:
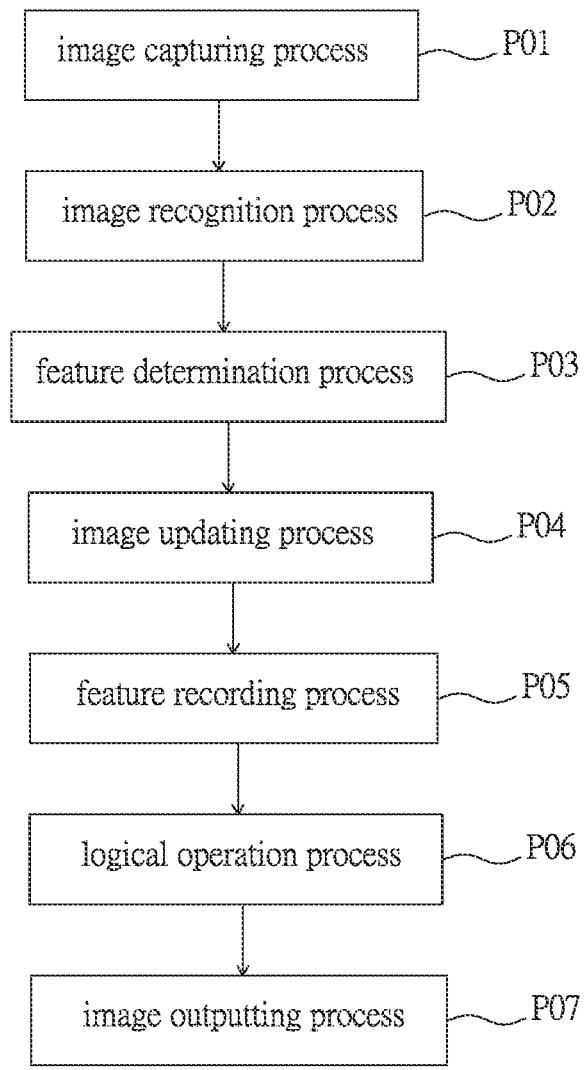
FIG. 1 is a flowchart showing a method for controlling image display according to a preferred embodiment of the present invention.

Referring to FIG. 1, a method for controlling image display of a preferred embodiment of the present invention includes an image capturing process P01, an image recognition process P02, a feature determination process P03, an image updating process P04, and a feature recording process P05, a logical operation process P06 and an image outputting process P07. The method for controlling image display can perform corresponding adjustments to the image according to the content features of the image to enable the audience to focus on the key points in the image.

The image capturing process P01 captures an input image through electronic devices such as cameras, video cameras, document cameras, or image capture cards that have the function of capturing images or image signals, for example.

The image recognition process P02 is to perform image recognition on the input image, which can recognize at least one specified feature in the input image and generate a recognized image. The so-called specified features are, for example, human shapes, human faces, specific facial features, specific human body parts, specific objects (such as but not limited to vehicles, tables, and chairs, etc.), and combinations thereof. In the embodiment, the specified feature is, for example, a hand feature of a human body, which includes, but is not limited to, fingers, palms, wrists, and the like. The generation of the recognized image may be based on at least one specified feature in the input image and correspondingly generate the recognized image including at least a part of the input image. It may also be based on at least one specified feature in the input image and correspondingly generate at least one recognition area in the input image, which is not limited here.

The feature determination process P03 is to judge whether there is a target feature in the recognized image. The so-called target feature is to further judge the detailed features from the recognized image. In the embodiment, since the specified feature is the hand feature of the human body, the target feature can include but not limited to pinch, grip, thumb, or specific number of fingers etc. In other embodiments, the target feature may also be, for example but not limited to, blinking, pouting, wheels, headlights, or table legs. In other embodiments, judging whether the target feature exists in the recognized image may be judging whether the target feature exists in at least one recognized area, that is, judging whether the target feature exists in the at least one recognized area in the input image feature. For example, the input image may be an image including a palm and a wrist, and then the finger recognition is performed on the image to generate a corresponding finger area (i.e., the recognized area) on the image. Then determine whether there is a hand feature such as pinch or grip (i.e., the target feature) in the finger area (i.e., the recognized area). Next, when the target feature exists in the recognized image, the feature determination process P03 further judges whether there is an indicator pattern recorded in the image control system and generates a first command or a second command accordingly.

The image updating process P04 generates the indicator pattern according to the first command and superimposes the indicator pattern on the position corresponding to the specified feature in the input image to generate an output image. Wherein, the indicator pattern is a pattern added to the input image corresponding to the target feature in the present invention so that the viewing user can focus on the part indicated by the indicator pattern after receiving the output image. In the embodiment, the indicator pattern includes, but is not limited to, arrows, circles, or fingers with indicative properties, for example.

The feature recording process P05 is to record at least one feature information of the target feature according to the second command. Since the target feature in this embodiment is, for example, pinch, grip, thumb, or a specific number of fingers, the feature information may include a gesture category, a time, a coordinate, and combinations thereof. Wherein, the feature information of time is the time information corresponding to the input image with the target feature, and the feature information of coordinates is the coordinate position information of the target feature in the input image.

The logical operation process P06 performs logical operations based on a plurality of recorded feature information and performs the image updating process P04 according to an operation result. Here, after a plurality of operation cycles, if the target feature exists in the input image, the corresponding feature information (including gesture type, time, coordinates, etc.) will be continuously recorded. Therefore, the logical operation process can calculate the displacement of the target feature, the duration of the target feature, or the appearance of the target feature at a specific time interval, etc. based on the plurality of feature information. Then the image updating process P04 can enlarge, drag, generate a new indicator pattern, or clear the indicator pattern on the input image according to the operation result, and then generate the output image. Finally, the image outputting process P07 outputs the output image.

It should be noted that the various processes performed by the method for controlling the image display above are only examples and are not restrictive. The diagrams and the above sequence are arranged for the convenience of description only and do not limit their performing sequence.

In addition, it should be noted that the above-mentioned specified feature recognition and the target feature judgment can be completed by hand motion recognition algorithms. The algorithms include data collection, model training, and model testing. Taking the target gesture "pinching" as an example, the data collection includes collecting pictures containing "pinching" and labeling them. The model training is the previous picture and marked as data, and the data is input to the deep learning model, wherein the deep learning model is an Object Detection model, such as You Only Look Once (YOLO). The model testing is to capture images and perform object recognition through a trained learning model.

Figure 2:
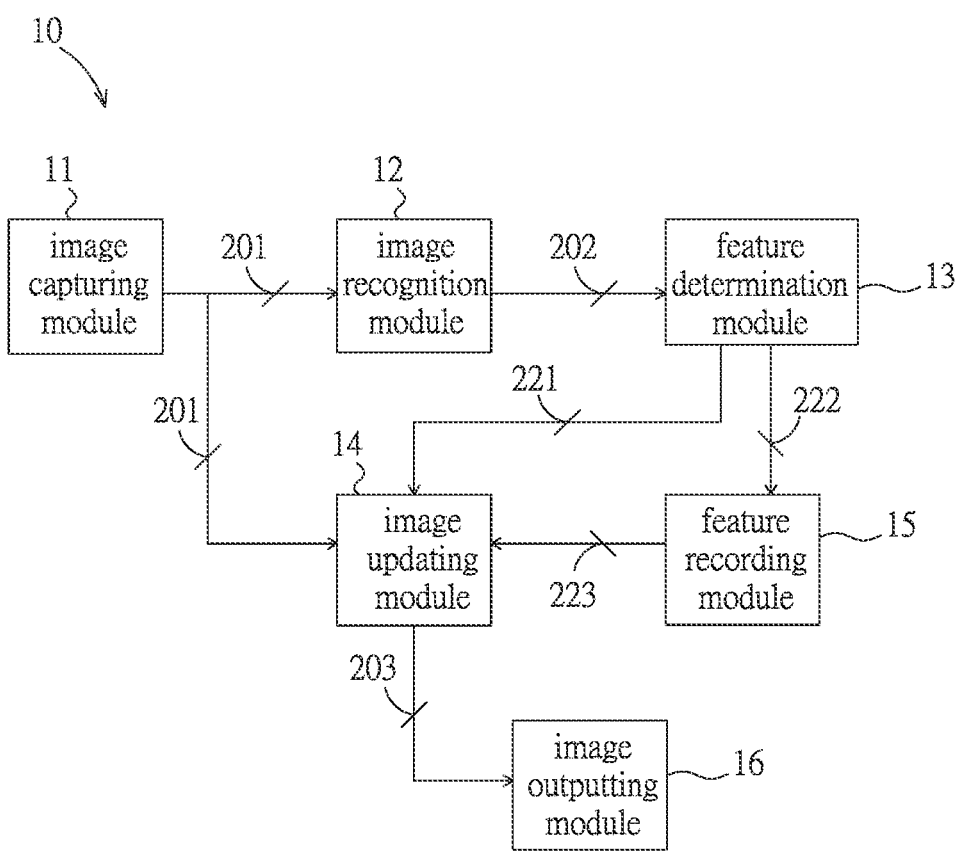
FIG. 2 is a schematic block diagram showing an image control system according to the first embodiment of the present invention.

Referring to FIG. 2, an image control system 10 of a preferred embodiment of the present invention includes an image capturing module 11, an image recognition module 12, a feature determination module 13, an image updating module 14, a feature recording module 15, and an image outputting module 16.

The image capturing module 11 includes, but is not limited to, electronic devices capable of capturing images, such as cameras, video cameras, document cameras, and image capture cards. In the embodiment, the image capturing module 11 is, for example, a document camera, which captures an input image 201.

The image recognition module 12 is coupled with the image capturing module 11 and performs an image recognition process on the input image 201 after receiving it. The image recognition module 12 recognizes at least one specified feature in the input image 201 according to settings and generates a recognized image 202. In the embodiment, the image recognition module 12 recognizes hand features in the input image 201.

The feature determination module 13 is coupled with the image recognition module 12 and receives the recognized image 202. The feature determination module 13 is to judge whether there is the target feature in the recognized image 202, in the embodiment, the target feature is a target gesture, which includes but not limited to "pinch" or "hold". The feature determination module 13 will then judge whether there is an indicator pattern recorded in the image control system 10 when the judgment result is that the target gesture exists in the recognized image 202.

The so-called indicator pattern is a pattern added to the target gesture in the input image in the present invention so that the viewing user can focus on the part indicated by the indicator pattern. Here, the indicator pattern includes, but is not limited to, arrows, circles, or fingers, etc., which have indicative properties. The feature determination module 13 generates a first command 221 when the indicator pattern does not exist in the input image 201.

The image updating module 14 is respectively coupled to the image capturing module 11 and the feature determination module 13 and receives the input image 201 and the first command 221. The image updating module 14 generates the indicator pattern according to the first command 221 and performs the image updating process. Wherein, the image updating process includes superimposing the indicator pattern on the input image 201 to generate an output image 203. Then, the output image 203 is transmitted to the image outputting module 16 to be output to the viewing users. Since the output image 203 played by the viewing user has the indicator pattern, the viewing user can focus on the area of the indicator pattern.

The feature recording module 15 is coupled to the feature determination module 13 and the image updating module 14 respectively. When the indicator pattern is recorded in the image control system 10, the feature determination module 13 generates a second command 222. The second command 222 is to enable the feature recording module 15 to record a feature information of the target gesture, which includes but not limited to gesture category, time, and coordinates. Wherein, the gesture category indicates, for example, that the target gesture is "pinch" or "grip"; the time is, for example, the time at which the target gesture occurs; the coordinates are, for example, the coordinates of the target gesture in the input image 201. In the embodiment, the feature information can be recorded in, for example but not limited to, buffer, RAM, Flash, hard drive, or SSD.

The presence of the indicator pattern recorded in the image control system 10 above means that the indicator pattern has been superimposed on the current output image and has not been eliminated. The record is, for example, stored in a storage unit or recorded in software (program), which is not limited.

After a plurality of operation cycles, the image updating module 14 performs a logical operation process according to the recorded feature information 223 and performs an image updating process according to an operation result of the logical operation process. The image updating process includes, but is not limited to, zooming and dragging the input image 201, generating a new indicator pattern, or clearing the indicator pattern, etc., for example. The following are examples of different scenarios.

In the first scenario, for example, after the indicator pattern appears, the speaker continues to maintain the "pinch" gesture. This situation may correspond to the presence of the indicator pattern that has been recorded in the image control system 10, and the coordinates of the target gesture are kept within a certain range. Accordingly, the image updating module 14 can gradually enlarge the indicator pattern in equal proportions so as to adjust the key area that the speaker expects to emphasize.

In the second scenario, for example, the speaker maintains the "pinch" gesture within a first time threshold (e.g., 3 seconds) and moves to a nearby first position threshold (e.g., 3 cm). This situation may correspond to the existence of the indicator pattern that has been recorded in the image control system 10, and the coordinate position of the target gesture has moved within the first time threshold. Accordingly, the image updating module 14 can drag the indicator pattern along with the coordinate position of the target gesture.

In the third scenario, for example, within a second time threshold (e.g., 5 seconds), the speaker makes a "pinch" gesture again outside a second position threshold (e.g., 3 cm away). Accordingly, the image updating module 14 can generate a new indicator pattern so that the output image 203 has multiple indication functions.

In the fourth scenario, for example, after a third time threshold (e.g., 10 seconds later), the speaker demonstrates the "pinch" gesture again. Accordingly, the image updating module 14 can clear all the indicator patterns in the output image 203.

Figure 3:
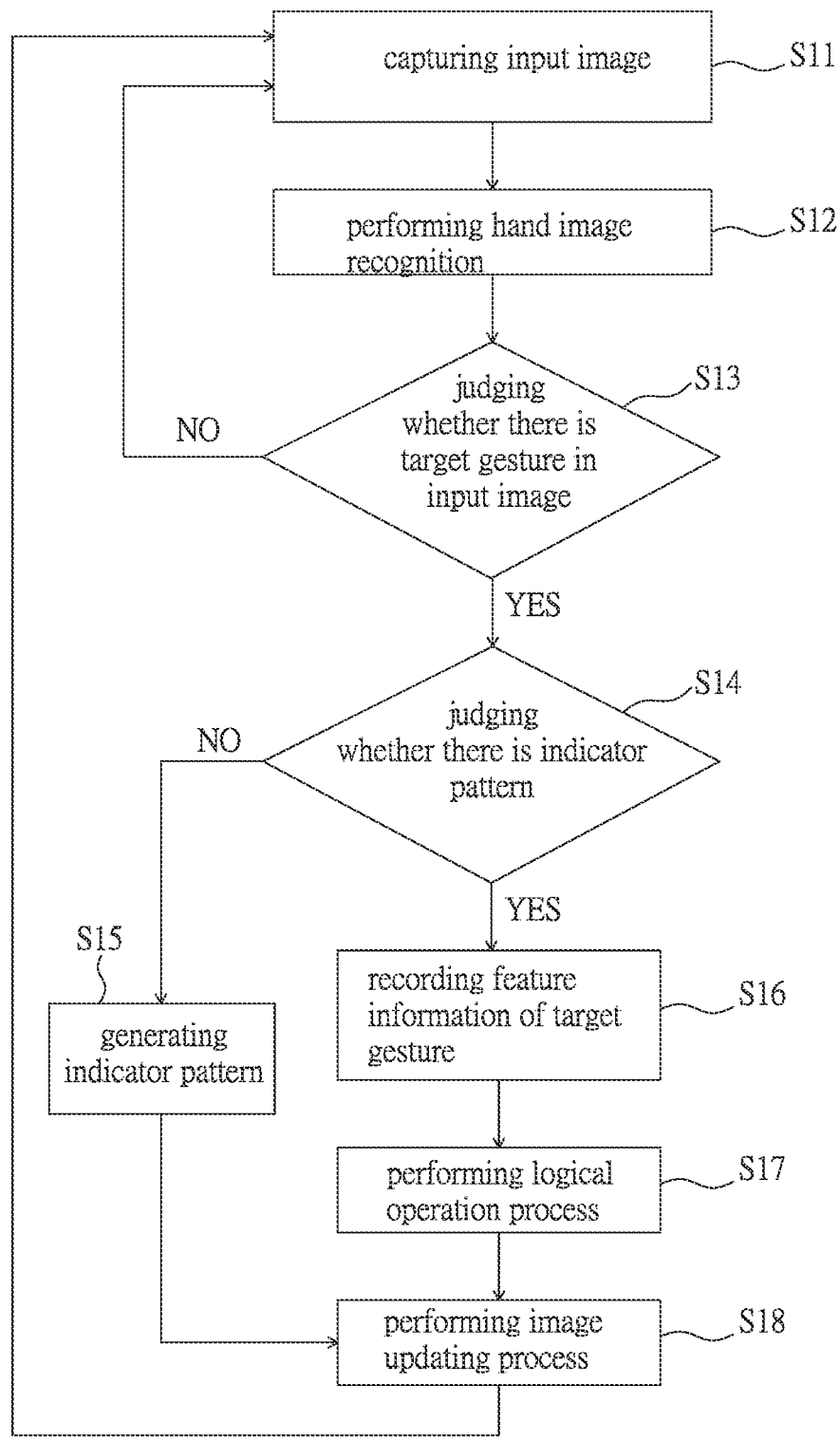
FIG. 3 is a further flow chart showing the steps of the method for controlling image display.
Figure 4A:
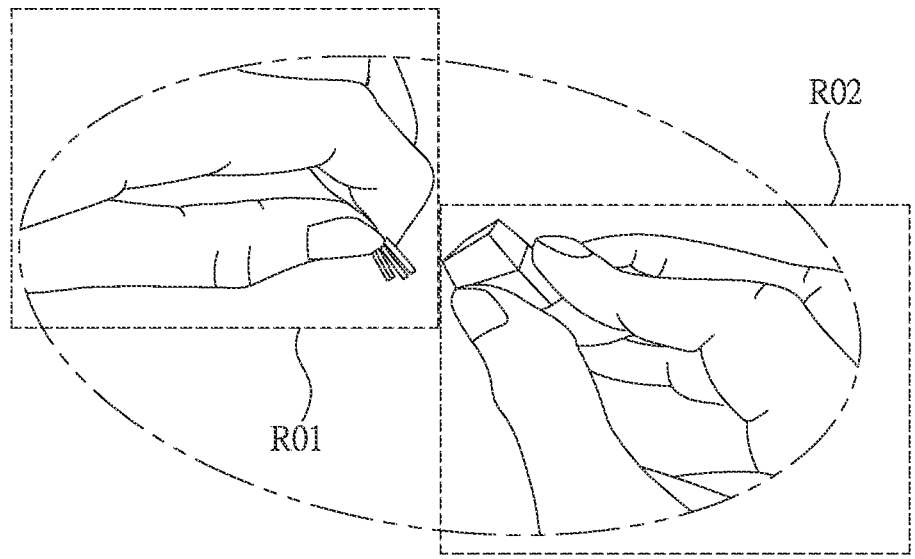
FIGS. 4A and 4B are schematic diagrams of the input image and the output image in the method for controlling image display.
Figure 4B:
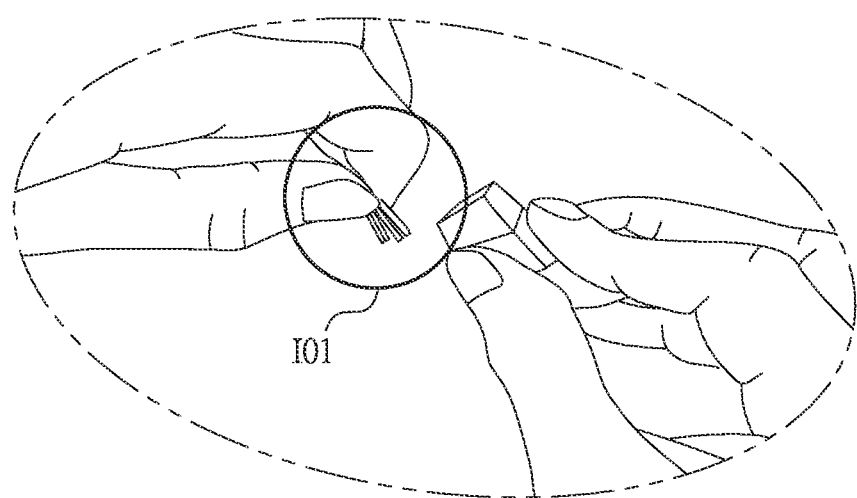

Referring to FIGS. 3, 4A, and 4B, an example is used to further illustrate the method for controlling image display of the preferred embodiment of the present invention based on the above-mentioned system and process. In this embodiment, an example of a speaker operating wire processing is used for illustration. As shown in FIG. 3, the method for controlling image display includes steps S11 to S18.

Step S11 is to capture an input image by the image capturing module (as shown in FIG. 4A). The input image can contain only part of the hand image of the speaker, not even the entire palm.

Step S12 is to perform the hand image recognition on the input image by the image recognition module and generate a recognized image. The recognized image can be generated by generating at least a part of the recognized image of the input image based on at least one specified feature in the input image or can be generated on the input image based on at least one specified feature in the input image. corresponding to produce at least one recognized area, such as the recognized areas R01 and R02 in FIG. 4A. In this step, the image control system starts to perform the hand image recognition using the hand motion recognition algorithm.

In step S13, the feature determination module judges whether there is a target gesture (such as "pinch") in the input image. Step S14 is performed when the judgment result is "Yes" and step S11 is re-performed when the judgment result is "No". In the embodiment, as shown in FIG. 4A, since there is an action of fingers pinching the wire in the input image, the judgment result is "Yes".

In step S14, the feature determination module further judges whether there is an indicator pattern recorded in the image control system. The first command is generated and step S15 is performed when the judging result is "No" and the second command is generated and step S16 is performed when the judging result is "Yes". In the embodiment, since the system has just received the input image, the indicator pattern does not exist in the image and system records, so the judgment result is "No".

Step S15 is to generate the indicator pattern and then execute step S18. Step S18 is to perform the image updating process by the image updating module and superimpose the indicator pattern 101 on the coordinate position corresponding to the target gesture in the input image to generate the output image (as shown in FIG. 4B). Therefore, the speaker can generate the indicator pattern in the video without other operations so that the viewer can focus on the position marked by the indicator pattern.

Next, when step S14 is performed next time because the system has already recorded the existence of the indicator pattern, the judgment result of the feature determination module is "Yes" so that the second command will be generated and step S16 will be performed.

Step S16 is to record at least one feature information of the target gesture by the feature recording module, which may include information such as gesture type and coordinate position of the target gesture in the input image. Next, step S17 is performed, which is to perform the logical operation process by the image updating module according to a plurality of recorded feature information. Since the feature information includes time and coordinates, the logical operation process can obtain the operation result such as the duration of the target gesture and the distance moved, etc. Finally, step S18 is to perform the image updating process by the image updating module according to the image processing mode corresponding to the operation result.

In summary, the image control system and the method for controlling the image display of the present invention perform image recognition on the specified feature and the target feature in the input image and can directly adjust the image screen according to the recognition result. Therefore, when it is applied to the occasion where the lecturer is giving a lecture, the lecturer can intuitively control the change of the image screen without being distracted to adjust the screen. In addition, viewing users, can also intuitively receive the key points that the speaker wants to express and have a better experience.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

What is claimed is:

1. A method for controlling image display, which is cooperated with an image control system, comprising:
   an image capturing process, which captures an input image;
   an image recognition process, which recognizes at least one specified feature in the input image and generates a recognized image;
   a feature determination process, which judges whether there is a target feature in the recognized image and further judges whether there is an indicator pattern recorded in the image control system when the target feature exists in the recognized image and further generates a first command when the indicator pattern does not exist in the input image;
   an image updating process, which generates the indicator pattern according to the first command and superimposes the indicator pattern on the input image to generate an output image; and
   an image outputting process, which outputs the output image.

2. The method for controlling image display of claim 1, wherein the indicator pattern is superimposed on the input image corresponding to a position of the at least one specified feature.

3. The method for controlling image display of claim 1, wherein the feature determination process further generates a second command when the indicator pattern is recorded in the image control system, wherein the method further comprises:
   a feature recording process, which records at least one feature information of the target feature according to the second command, wherein the at least one feature information includes a gesture category, a time, a coordinate, or a combination thereof.

4. The method for controlling image display of claim 3, further comprising:
   a logical operation process, which performs a logical operation according to the at least one recorded feature information and performs the image updating process according to an operation result.

5. The method for controlling image display of claim 4, wherein the image updating process comprises performing an image processing on the input image including zooming, dragging, creating a new indicator pattern, or clearing the indicator pattern.

6. An image control system, which is cooperated with a method for controlling image display, comprising:
   an image capturing module, which captures an input image;
   an image recognition module, which receives the input image and recognizes at least one specified feature in the input image to generate a recognized image;
   a feature determination module, which receives the recognized image, judges whether there is a target feature in the recognized image, and further judges whether there is an indicator pattern recorded in the image control system when the target feature exists in the recognized image, and further generates a first command when the indicator pattern does not exist in the input image;

an image updating module, which generates the indicator pattern and performs an image updating process according to the first command, wherein the image updating process superimposes the indicator pattern on the input image to generate an output image; and an image outputting module, which receives and outputs the output image.

7. The image control system of claim 6, wherein the feature determination module further generates a second command when the indicator pattern is recorded in the image control system, wherein the image control system further comprises:

a feature recording module, which records at least one feature information of the target feature according to the second command, wherein the at least one feature information comprises a gesture category, a time, a coordinate, or a combination thereof.

8. The image control system of claim 7, wherein the image updating module further comprises performing a logical operation process according to the at least one recorded feature information and performing the image updating process according to an operation result of the logical operation process.

9. The image control system of claim 8, wherein the image updating process further comprises performing image processing on the input image including zooming, dragging, creating a new indicator pattern, or clearing the indicator pattern.

10. The image control system of claim 2, wherein the feature recording module further records presence or absence of the indicator pattern superimposed on the input image.

* * * * *